(12) United States Patent
Duma et al.

(10) Patent No.: US 9,216,407 B2
(45) Date of Patent: Dec. 22, 2015

(54) RESID HYDROTREATING CATALYST

(71) Applicant: Advanced Refining Technologies LLC, Columbia, MD (US)

(72) Inventors: Viorel D. Duma, Hercules, CA (US); Matthew P. Woods, Baltimore, MD (US); Stanislaw Plecha, Columbia, MD (US)

(73) Assignee: Advanced Refining Technologies LLC, Columbia, MD (US)

( * ) Notice: Subject to any disclaimer, the term of this patent is extended or adjusted under 35 U.S.C. 154(b) by 0 days.

(21) Appl. No.: 14/212,879

(22) Filed: Mar. 14, 2014

(65) Prior Publication Data
US 2014/0262956 A1   Sep. 18, 2014

Related U.S. Application Data

(60) Provisional application No. 61/790,064, filed on Mar. 15, 2013.

(51) Int. Cl.
| | | |
|---|---|---|
| *B01J 23/755* | (2006.01) |
| *C10G 45/04* | (2006.01) |
| *C10G 45/08* | (2006.01) |
| *B01J 21/04* | (2006.01) |
| *B01J 23/28* | (2006.01) |
| *B01J 23/75* | (2006.01) |
| *B01J 23/883* | (2006.01) |
| *B01J 27/14* | (2006.01) |
| *B01J 35/00* | (2006.01) |
| *B01J 35/10* | (2006.01) |
| *B01J 37/02* | (2006.01) |

(52) U.S. Cl.
CPC ............. *B01J 23/755* (2013.01); *B01J 21/04* (2013.01); *B01J 23/28* (2013.01); *B01J 23/75* (2013.01); *B01J 23/883* (2013.01); *B01J 27/14* (2013.01); *B01J 35/002* (2013.01); *B01J 35/1019* (2013.01); *B01J 35/1042* (2013.01); *B01J 37/0207* (2013.01); *C10G 45/08* (2013.01); *B01J 35/108* (2013.01); *B01J 35/1047* (2013.01); *B01J 35/1061* (2013.01); *C10G 2300/107* (2013.01); *C10G 2300/205* (2013.01)

(58) Field of Classification Search
None
See application file for complete search history.

(56) References Cited

U.S. PATENT DOCUMENTS

| | | | | |
|---|---|---|---|---|
| 3,891,539 | A  * | 6/1975 | Nelson et al. ................... | 208/59 |
| 4,301,037 | A  * | 11/1981 | Sanchez et al. ............... | 502/303 |
| 4,797,139 | A | 1/1989 | Bauer | |
| 8,110,527 | B2 * | 2/2012 | Liu et al. ........................ | 502/439 |
| 2009/0062582 | A1 * | 3/2009 | Ackerman et al. ............ | 585/266 |
| 2010/0137642 | A1 | 6/2010 | King et al. | |

\* cited by examiner

*Primary Examiner* — Melvin C Mayes
*Assistant Examiner* — Stefanie Cohen
(74) *Attorney, Agent, or Firm* — Lerner, David, Littenberg, Krumholz & Mentlik, LLP

(57) ABSTRACT

Catalyst supports, supported catalysts, and a method of preparing and using the catalysts for the demetallation of metal-containing heavy oil feedstocks are disclosed. The catalyst supports comprise precipitated alumina prepared by a low temperature pH swing process. A large portion of the pore volume of the catalyst supports has pores with a diameter in the range of about 200 Å to about 500 Å. Catalysts prepared from the supports of the invention exhibit improved catalytic activity and stability to remove metals from heavy hydrocarbon feedstocks during a hydroconversion process. The catalysts also exhibit increased sulfur and MCR conversion during the hydroconversion process.

18 Claims, 1 Drawing Sheet

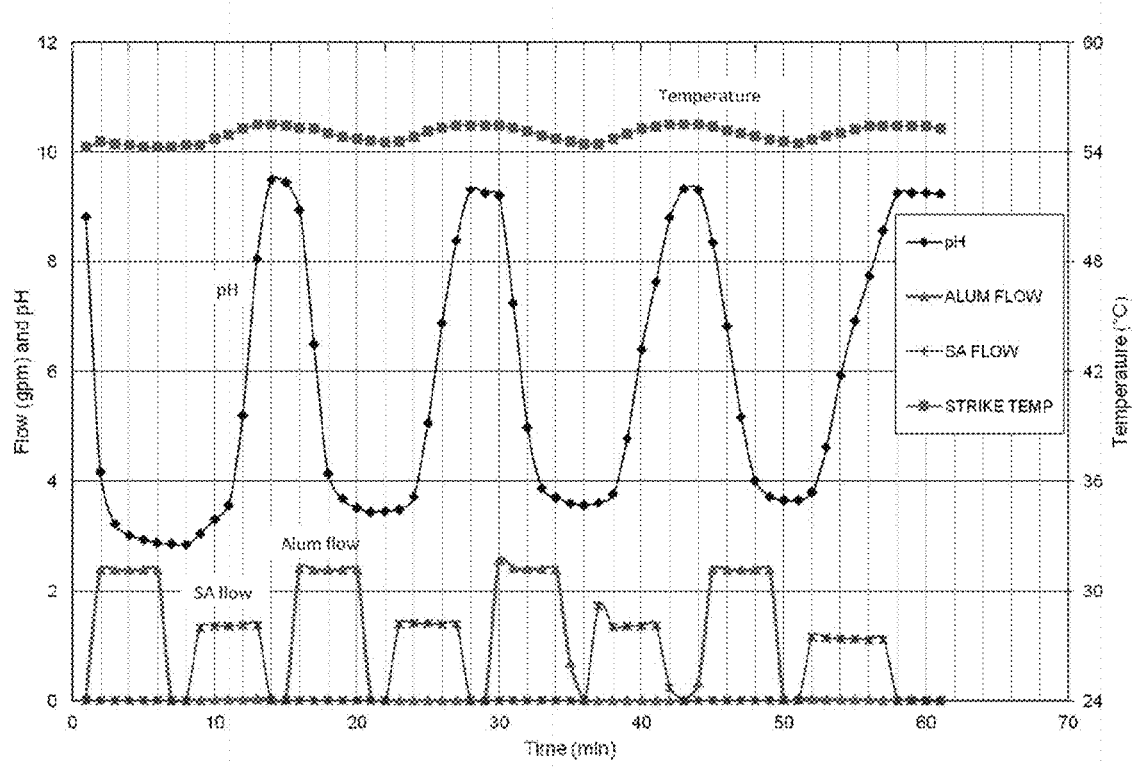

RESID HYDROTREATING CATALYST

CROSS-REFERENCE TO RELATED APPLICATIONS

This application claims the benefit of the filing date of U.S. Provisional Patent Application No. 61/790,064, filed Mar. 15, 2013, the disclosure of which is hereby incorporated herein by reference.

FIELD OF THE INVENTION

The present invention relates to the catalytic hydrotreating of heavy hydrocarbon oils containing metals. In particular, the present invention relates to a catalyst support, a method of preparing the catalyst support, catalyst compositions prepared using the support and a process of reducing sulfur and metals content of heavy hydrocarbon oils and resids using the aforementioned catalyst compositions.

BACKGROUND OF THE INVENTION

In the petroleum refining industry it is often useful to upgrade certain oil and fractions like heavy oils and residuum by hydrotreating. Examples of such hydrotreating processes are hydrodemetallation, hydrodesulfurization, and hydrodenitrogenation. In these processes the feedstock is contacted with a hydroconversion catalyst in the presence of hydrogen at elevated pressure and temperature. Due to strict demands imposed by ecological regulations, the refining industry has become increasingly more focused on producing cleaner fuels with high quality and with a minimum content of contaminants such as sulfur, nitrogen and heavy metals.

Catalysts used in hydrotreating processes generally comprise catalytically active metals from Groups 6, 9 and 10 of The Periodic Table and are typically supported on alumina which may be combined with other inorganic refractory materials such as silica, magnesia, titania, zirconia and the like. Secondary promoters or additives such as halogens, phosphorous and boron, have also been used to enhance catalytic properties. To achieve the maximum effect from hydrotreating processes, it is necessary to optimize catalyst activity and selectivity to a desired hydrotreating reaction. Catalyst activity and selectivity is determined and affected by such factors as the nature and properties of the catalyst support, the catalytic agents, activity and selectivity of promoters as well as the preparation and activation method used.

Where heavy feedstocks contain organometallic compounds, the effectiveness of hydrotreating catalysts tend to decline relatively rapidly, particularly when the impurity is more than about 10 to 20 ppm metals such as dissolved nickel and vanadium. These metallic impurities are said to deposit on the surface and in the pores of these catalysts reducing their effectiveness.

Hydrotreated hydrocarbon feedstocks having a low Conradson carbon residue are also highly desirable in the refining industry. Carbon residue is a measurement of the tendency of a hydrocarbon to form coke. Expressed in weight percent, carbon residue may be measured as microcarbon residue (MCR). The MCR content in a hydrotreated residual feedstock is an important parameter since the hydrotreated residue usually acts as feed to a coker or a fluid catalytic cracking (FCC) unit. Decreasing the MCR content in a hydrotreated residue decreases the amount of low value coke generated in the coker and increases the amount of gasoline generated in the FCC unit.

To this end, there remains a need to develop catalyst compositions that are less expensive and/or more effective in removing metal and/or sulfur contaminants from hydrocarbon feed streams, in particularly heavy hydrocarbon feed streams, during a hydrotreating process. There also remains a need for improved hydrodemetallation and/or hydrodesulfurization catalysts which provide good MCR conversion during a hydrotreating process.

SUMMARY OF THE INVENTION

The present invention provides alumina base compositions which are useful to prepare catalyst supports having a pore volume distribution especially suited for the preparation of demetallation and desulfurization hydroconversion catalysts. In accordance with the invention, the alumina compositions are prepared by a co-precipitation process wherein at least two cycles of pH changes are applied by subsequent addition of an acid solution followed by a base solution. Catalyst compositions of the invention exhibit an increased catalytic activity and stability to remove metals while simultaneously reducing the content of sulfur and microcarbon residue (MCR) of a heavy hydrocarbon fraction during a hydrotreating process.

In one embodiment of the invention, alumina compositions are provided which compositions comprise spherical or substantially spherical shaped particles having a crystalline size X-ray Diffraction Ratio (020:120) of less than 1.0. Alumina compositions of the invention typically have a total nitrogen pore volume greater than 0.9 cc/g, and a BET surface area in the range of about 250 to about 500 $m^2/g$.

In another embodiment of the present invention is provided a low temperature pH swing process useful to prepare alumina compositions from which catalyst supports and supported catalysts having increased catalytic activity and stability to remove metals and reduce the content of sulfur and microcarbon residue (MCR) in a heavy hydrocarbon fraction during a hydrotreating process. The pH swing process of the invention comprises performing at least two cycles of pH changes at a temperature of about 72° C. or less by the addition of an acid solution followed by addition of a base solution to provide a co-precipitated alumina in accordance with the invention.

In yet another embodiment of the present invention, alumina based catalyst supports having a distinct pore structure are provided. Alumina supports of the invention are prepared using inventive alumina compositions of the invention and possess a pore volume distribution such that a large proportion of its pore volume is in pores having a diameter in the range of about 200 Å to about 500 Å.

Another embodiment of the present invention provides improved supported hydrotreating catalysts for reducing the content of metals in a heavy hydrocarbon feed stock containing metals during a hydrotreating process. Catalysts in accordance with the present invention are prepared by impregnating catalytically active Group 6, 9 and 10 metals or precursor metal compounds, and optionally, phosphorous compounds, on a catalyst support in accordance with the invention.

Still another embodiment of the present invention provides improved hydrotreating catalysts which have the ability to reduce the content of metals while simultaneously reducing the content of sulfur and microcarbon residue (MCR) in a hydrotreated heavy hydrocarbon fraction.

In yet another embodiment of the present invention is provided improved hydrotreating processes using supported catalyst compositions and processes in accordance with the present invention.

These and other features and advantages of the present invention will become apparent after a review of the following detailed description of the disclosed embodiments and the appended claims.

BRIEF DESCRIPTION OF THE DRAWING

The FIGURE is a graphic representation of temperature, pH and reactant flow versus time for a pH swing process in accordance with the present invention.

DETAILED DESCRIPTION OF THE INVENTION

The present invention provides inventive alumina compositions prepared by a low temperature pH swing process. For purposes of this invention, the term "pH swing" as it relates to the process of preparing the compositions of the invention, refers to a method wherein the pH of an aqueous slurry is changed or cycled from a low, acidic pH to a high, alkaline pH by the addition of one or more acidic compounds to lower the pH in a first step followed by the addition to the slurry of one or more alkaline compounds in order to raise the pH in a second step. These two process steps together are considered herein to be one "cycle" or "pH swing".

Generally, alumina compositions of the invention comprise are in the form of powders, i.e., particles having an average particle size ranging from about 5 micron to about 80 micron. Particles comprising the alumina compositions of the invention are generally spherical or substantially spherical in shape. For purposes of the present invention the term "spherical" is used herein to designate an oblate or spheroid shape. The term "substantially spherical" is used herein to indicate greater than 90% of the particles have an oblate or spheroid shape.

Typically, the alumina compositions of the invention possess a nitrogen total pore volume of about 0.9 cc/g or greater. In a preferred embodiment of the invention, alumina compositions of the invention have a nitrogen total pore volume in the range of about 0.9 cc/g to about 1.5 cc/g.

Surface area as defined herein is determined by BET surface area analysis. The BET method of measuring surface area has been described in detail by Brunauer, Emmett and Teller in *J. Am. Chem. Soc.* 60 (1938) 309-319, which is incorporated herein in its entirety by reference. Generally, alumina compositions of the present invention have a BET surface area of at least about 80 m$^2$/g. In a preferred embodiment, the alumina compositions of the present invention have a BET surface area ranging from about 80 m$^2$/g to about 180 m$^2$/g.

Typically, particles comprising the alumina compositions of the invention have a crystalline structure with a maximum crystalline dimension of up to about 60 Å as measured using X-ray Diffraction (XRD) techniques. In one embodiment of the invention, the particles of the inventive alumina compositions have a crystalline structure having a first dimension as measured along a 120 XRD plane and a second dimension as measured along a 020 XRD plane, wherein the ratio of the second dimension as measured along a 020 XRD plane, and the first dimension as measured along a 120 XRD plane (020:120) is less than 1. In a preferred embodiment of the invention, the XRD ratio (020:120) ranges from about 0.6 to about 0.9.

The process used for preparing the alumina compositions of the invention generally comprises a low temperature pH swing process wherein in a first step, at least one acidic compound is added to heated water in an amount sufficient to provide an initial aqueous slurry having a pH of less than 5. In a preferred embodiment of the invention, the acidic compound is added in an amount sufficient to provide a pH ranging from about 2 to about 4.5 in the initial slurry. In an even more preferred embodiment of the invention, the acidic compound is added in an amount sufficient to provide a pH ranging from about 2.5 to about 4.0 in the initial slurry.

In a second step, the process comprises adding an amount of at least one alkaline compound to the initial slurry in an amount sufficient to increase the pH of the resulting slurry to a value greater than 7 and precipitate seed alumina. In a preferred embodiment of the invention, the alkaline compound is added to the initial slurry in an amount sufficient to increase the pH of the slurry within a range of about 7.5 to about 10.0. In an even more preferred embodiment of the invention the alkaline compound is added in an amount sufficient to increase the pH of the resulting slurry within a range of from about 8.0 to about 9.5.

The two-step precipitation process completes a first cycle or swing. After completion of the first cycle or swing, an acidic compound is again added to the slurry in an amount sufficient to lower its pH to within the range of about 2.0 to about 5.0, preferably from about 2.0 to about 4.5, most preferably, from about 2.5 to about 4.0. This step is followed by the addition of at least one alkaline compound in an amount sufficient to increase the pH of the slurry to a value above 7.0, preferably within the range from about 7.5 to about 10, most preferably from about 8.0 to about 9.5, which completes a second pH swing or cycle.

The number of swings prior to a final pH swing may vary depending upon the desired properties in the final precipitated alumina. In accordance with the process of the invention, at least two pH swings are conducted prior to the final pH swing. In a preferred embodiment of the invention, the sequence of pH swings before the final pH swing is two or more. In a more preferred embodiment of the invention, the sequence of pH swings before the final pH swing ranges from about 3 to about 7 swings or cycles.

In accordance with the process of the invention, following the desired number of swings, a final pH swing is conducted wherein the acidic compound is again introduced to lower the pH of the slurry to within the range as described herein above, while the alkaline compound is added in an amount sufficient to increase the pH of the final slurry to at least about 9. In a preferred embodiment of the invention, the alkaline compound is added in an amount sufficient to increase the pH of the final slurry to within a range of about 9 to about 9.5.

Acidic compounds useful in the pH swing process of the invention include, but are not limited to, compounds selected from the group consisting of nitric acid, sulfuric acid, hydrochloric acid, aluminum sulfate, aluminum nitrate, aluminum chloride, aluminum chlorohydrate, and combinations thereof. In a preferred embodiment of the invention, the acidic compound is aluminum sulfate.

Alkaline compounds useful in the pH swing process of the invention, include, but are not limited to, a compound selected from the group consisting of sodium hydroxide, sodium aluminate, aluminum hydroxide, ammonium hydroxide, or combinations thereof. In a preferred embodiment of the invention, the alkaline compound is sodium aluminate.

The temperature conditions at which the pH swing process is conducted can affect the properties of final alumina particles. A low temperature during the entire process is preferred. Generally, the temperature of the mixing and reaction steps of each of the pH swings should be in the range of about 72° C. or less. In a preferred embodiment of the invention, the temperature of each of the pH swings should be in the range of about 48° C. to about 72° C. In a more preferred embodiment of the invention, the temperature of each pH swing ranges from about 52° C. to about 66° C.

In addition to the control of the temperature and pH of the various addition steps of each of the pH swings, it is also desirable to combine the components in amounts such as to provide a final slurry having a solids content ($Al_2O_3$) of about 1.0 to about 10.0 weight percent, based upon the total weight of the slurry. The precipitated solids are recovered from this final slurry.

The period of time elapsed between the two addition steps of a pH swing or cycle should be a period of time sufficient to provide for adequate mixing of slurry components. In a preferred embodiment of the invention, the time between the two additions steps is a period of time sufficient to provide a homogeneous or substantially homogeneous slurry. Typically, the time period between the two additions steps in a cycle ranges from about 1 minute to about 10 minutes.

After the completion of the above described pH swings or cycles, the alumina precipitate resulting from the final swing may be recovered from the slurry. Any suitable method known to those skilled in the art for separating the precipitate solids from the final slurry may be used to recover the precipitated solid. Such methods include gravity separation, pressure separation, and vacuum separation and can include the use of equipment such as, for example, belt filters, plate-and-frame filters and rotary vacuum filters.

The filtered precipitated alumina, or filter cake, may be washed with water to remove impurities such as sodium and sulfate salts. One or more washing steps may be used to wash the filtered precipitate alumina.

The washed precipitate is thereafter dried using any conventional drying method known to those skilled in the art to provide a dried precipitated alumina having a moisture content of about 22 to about 38 weight percent as determined by loss of ignition at 955° C. (1750° F.). In a preferred embodiment of the invention, the dried alumina has a moisture content of about 25 to about 36 weight percent based on the total weight of the alumina.

The precipitated alumina of the invention comprises a strongly aggregated system of spherical or substantially spherical alumina particles which form high viscosity aqueous acidic slurries, i.e. a slurry having an alumina content of greater than 20%, a pH below 5, and a viscosity greater than 500 cps. The precipitated alumina of the invention are particularly useful to prepare support materials from which a supported hydrotreating catalyst may be manufactured.

To prepare a catalyst support, an aqueous slurry of the dried alumina is treated with a peptizing agent to peptize the alumina. Suitable peptizing agents include but are not limited to, strong monobasic acids such as nitric acid or hydrochloric acid, organic acids such as formic acid, acetic acid or propionic acid and aqueous bases such as ammonium hydroxide. The peptized alumina is extruded and dried at a temperature ranging from about 100° C. to about 150° C. for about 10 minutes to about 2 hours.

The dried extrudate is thereafter calcined at a high temperature ranging from about 800° C. to about 1100° C. for about 1 hour to about 3 hours to obtain a final catalyst support. In a preferred embodiment, the dried extrudate is calcined at a temperature ranging from about 900° C. to about 1040° C. to obtain a final catalyst support material.

Alumina supports in accordance with the present invention possess specific properties of surface area, pore volume and pore volume distribution. Unless otherwise specified herein, the pore volume and pore size distribution properties of the alumina supports as defined herein are determined by Mercury Penetration Porosimetry. The mercury measurement of the pore volume and the pore size distribution of the alumina support material is performed using any suitable mercury porosimeter capable of a pressure range of atmospheric pressure to about 4,000 bar, with a contact angle, $\theta=140°$, and a mercury surface tension of 0.47_N/m at room temperature.

Supports of the invention have a distinct pore volume distribution such that a large portion of its pore volume is in pores having a diameter in the range of about 200 Å to about 500 Å. Generally, alumina catalyst supports in accordance with the present invention have the following pore volume distribution: a total pore volume in the range from about 0.8 cc/g to about 1.2 cc/g., with greater than 8% of the volume of pores, preferably from about 0.1 to about 0.4 cc/g, having a diameter greater than 350 Å, and 40% or greater of the volume of pores, preferably from about 0.4 to about 0.8 cc/g, having a diameter in the range of about 200 Å to about 500 Å and at least 5% of the volume of pores, preferably from about 0.04 to about 0.2 cc/g, having a diameter above 1500 Å.

In one embodiment of the invention, about 50% to about 80% of the total pore volume of the supports have pores with a diameter in the range of about 200 Å to about 500 Å.

In another embodiment of the invention, about 5% to about 20% of the total pore volume of the supports have pores with a diameter over 1,500 Å.

In yet another embodiment of the invention, greater than about 15% of the total pore volume of the support has pores with a diameter above 350 Å. The BET surface area of alumina supports in accordance with the present invention ranges from about 80 m$^2$/g to about 180 m$^2$/g. In a preferred embodiment of the invention, the BET surface area of the alumina supports ranges from about 100 m$^2$/g to about 150 m$^2$/g. Extruded supports in accordance with the invention may have various geometric forms, such as cylinders, rings, and symmetric and/or asymmetric polylobes, for instance, tri- or quadrulobes. Nominal sizes of the extrudates may vary. The diameter usually ranges from about 1 to about 10 mm, and the length ranges from about 1 to about 30 mm. In one embodiment of the invention, the diameter ranges from about 1 to about 3 mm and the length ranges from about 2 mm to about 10 mm. As will be understood by one skilled in the catalyst arts, catalyst particles produced from the supports will have a similar size and shape as the support.

The unique pore distribution of the invention supports make them particularly suitable for the preparation of supported catalyst compositions for use in a hydrotreating process. In accordance with one embodiment of the present invention, hydrotreating catalyst compositions are provided which compositions are comprised of catalytically active metals or precursor metal compounds of metals of Groups 6, 9 and 10 of The Periodic Table, and optionally phosphorous compounds, supported on alumina catalyst supports of the invention.

Catalysts in accordance with the invention are prepared by contacting the alumina supports with an aqueous solution of at least one catalytically active metal or precursor metal compound to uniformly distribute the desired metal on the support. Preferably, the metal is distributed uniformly throughout the pores of the support. In a preferred embodiment of the invention, the catalysts are prepared by impregnation of the catalyst supports to incipient wetness with an aqueous solution of the desired catalytically active metal or precursor compound.

Catalytically active metal and/or precursor metals compounds useful to prepare catalyst compositions of the invention, include, but are not limited to metals or compounds of metals selected from the group consisting of Group 6 of The Periodic Table, Group 9 of The Periodic Table, Group 10 of The Periodic Table and combinations thereof. Preferred Group 6 metals include, but are not limited to, molybdenum and tungsten. Preferred Groups 9 and 10 metals include, but are not limited to, cobalt and nickel. For purposes of this invention, the term "The Periodic Table" is used herein to mean "The Periodic Table of Elements".

Concentrations of Group 6 metals and/or metal compounds useful to prepared catalyst compositions of the present invention typically is an amount sufficient to provide from about 1.0 wt % to about 10 wt % of the desired Group 6 metal, preferably from about 2.0 wt % to about 5.0 wt %, in the total catalyst composition. Concentrations of Group 9 metals and/or metal compounds useful to prepare the catalyst compositions of the present invention typically is an amount sufficient to provide from about 0 wt % to about 5.0 wt % of the desired Group 9 metal, preferably from about 0.5 wt % to about 2.0 wt %, in the total catalyst composition. Concentrations of Group 10 metals and/or metal compounds useful to prepare the catalyst compositions of the present invention typically is an amount sufficient to provide from about 0 wt % to about 5.0 wt % of the desired Group 10 metal, preferably from about 0.5 wt % to about 2.0 wt %, in the total catalyst composition.

In a preferred embodiment of the invention the combinations of nickel and molybdenum catalytic agents are preferred. In a more preferred embodiment of the invention, the resulting catalyst comprises Mo concentrations in the range of about 3 to about 10 wt % and Ni concentrations in the range of about 0.1 to about 4 wt %, said wt % being based on the total catalyst composition.

Suitable precursor metal compounds of Groups 9 and 10 metals include, but are not limited to, metallic salts such as nitrates, acetates and the like. Suitable precursor metal compounds of Group 6 metals include, but are not limited to, ammonium molybdate, molybdic acid, molybdenum trioxide, and the like.

Catalytically active metals contemplated for use with the supports of the present invention are preferably used in the form of oxides and/or sulfides of the metals. In a preferred embodiment of the invention, the catalytically active metals are used in the form of oxides.

Catalyst compositions of the invention may also comprise a phosphorus component. In this case, the impregnating solution may also contain a phosphorus compound, e.g. phosphoric acid, phosphates, and the like, in addition to the desired catalytically active metals or precursor metal compounds. Concentrations in the range of about 0.1 to about 2.0 wt % of phosphorous based on the total catalyst composition are suitable for use in the catalyst compositions of the invention.

Following treatment of the supports with aqueous solutions of the catalytically active metal/s or precursor compound/s, the catalyst are optionally dried at a temperature in the range of about 100° C. to about 200° C. for about 10 minutes to about 2 hours. The dried catalyst is thereafter calcined at a temperature and for a time sufficient to convert at least part, preferably all, of the metal components or precursors to the oxide form. In a preferred embodiment of the invention, the catalyst is calcined at a temperature in the range of about 300° C. to about 600° C. for about 1 hour to about 3 hours.

As will be clear to a person skilled in the art, there is a wide range of variations on the impregnating method used to support the catalytic active metals on the catalyst supports. It is possible to apply a plurality of impregnating steps. It is within the scope of the invention that the impregnating solutions may contain one or more of the component or precursors to be deposited, or a portion thereof. Instead of impregnating techniques, other conventional methods of applying the active metals on the support, e.g. dipping, spraying, and the like, can be used. In the case of multiple or mixed (impregnation and dipping) applications steps, drying and/or calcining may be carried out as between steps.

Catalyst compositions according to the invention exhibit an increased catalytic activity and stability for demetallation of a heavy hydrocarbon feedstock containing metals during a hydrotreating process. The heavy hydrocarbon feedstock useful in the present invention can be obtained from any suitable source of hydrocarbons, including, for example, petroleum crude oils and tar sand hydrocarbons, such as, the heavy oils extracted from tar sand. The heavy hydrocarbon feedstock can be a vacuum resid or atmospheric resid component of a petroleum crude oil or a tar sand hydrocarbon. The heavy hydrocarbon feedstock may also include light and heavy gas oils, as well as petroleum crude oil, atmospheric residues and vacuum residues blended with gas oils, particularly vacuum gas oils, crudes, shale oils, and tar sand oils.

The heavy hydrocarbon feedstock generally will include a mixture of hydrocarbons derived from a crude oil or tar sand hydrocarbon material or other source of heavy hydrocarbons. A portion, preferably a major portion, of the heavy hydrocarbons of the mixture has a boiling temperature exceeding about 343° C. (650° F.). The heavy hydrocarbon feedstock is thus defined as having a boiling range, as determined by ASTM test procedure D-1160, such that at least about 20 wt % of the heavy hydrocarbon feedstock boils at a temperature exceeding 524° C. (975° F.). The preferred heavy hydrocarbon feedstock has a boiling range such that at least 30 wt % boils at a temperature exceeding 524° C. (975° F.), and, most preferably, at least 40 wt % of the heavy hydrocarbon feedstock boils at a temperature exceeding 524° C. (975° F.).

The API gravity of the heavy hydrocarbon feedstock can range from about 3 to about 20, but, more specifically, the API gravity is in the range of from 4 to 15, and, more specifically, from 4 to 11.

The heavy hydrocarbon feedstock can have a Conradson carbon residue content, as determined by ASTM testing method D-189, exceeding 5 weight percent and, more specifically, the Conradson carbon residue content is in the range of from 8 weight percent to 30 weight percent.

As earlier noted, the metals contained in the heavy hydrocarbon feedstock can include nickel or vanadium, or both. The nickel concentration in the heavy hydrocarbon feedstock can exceed 10 parts per million by weight (ppmw) or it can exceed 30 ppmw. More specifically, the nickel concentration in the heavy hydrocarbon feedstock can be in the range of from 40 ppmw to 500 ppmw. The vanadium concentration in the heavy hydrocarbon feedstock can exceed 50 ppmw or it can exceed 100 ppmw. More specifically, the vanadium concentration in the heavy hydrocarbon feedstock can be in the range of from 150 ppmw to 1500 ppmw.

Catalysts of the invention are also useful to decrease the content of sulfur simultaneously with demetallation during a hydrotreating process where the hydrocarbon feedstock being treated contains both sulfur and metals. The sulfur content of the feed is generally above 0.1 wt % and will frequently be more than 1 wt %. The nitrogen content is generally above 500 ppm and will frequently be in the range of from 500 ppm to 4000 ppm.

Further, catalysts in accordance with the present invention provide an increased micro carbon residue (MCR) conversion during a hydrotreating process. Consequently, the hydrotreated hydrocarbon fraction obtained exhibits a reduced MCR content as compared to the MCR content of the starting heavy hydrocarbon feedstock.

A hydrotreating process employing the catalyst compositions of this invention may be carried out under hydrotreating process conditions in an apparatus whereby an intimate contact of the catalyst composition with said metal containing feedstock and a free hydrogen containing gas is achieved, to produce a hydrocarbon-containing product having a reduced level of metals, e.g. nickel and vanadium, and, optionally sulfur. In accordance with the invention, the hydrotreating process can be carried out using a fixed catalyst bed. The hydrotreating process can be carried out as a batch process or, as a continuous process containing one or more fixed catalyst beds or in a plurality of fixed bed reactors in parallel or in series.

Typical hydrotreating process conditions useful in the invention include, but are not limited to, temperatures between 300° and 450° C., hydrogen pressures between 25 and 200 bar, $H_2$:oil ratios between 150 and 1500 N1/1, and space velocities (hr$^{-1}$) between 0.1 and 5. In one embodiment of the invention, the operating conditions for metal containing hydrocarbon feedstock desulfurization process include a reaction zone temperature of 350° C. to 400° C., a pressure of 100 to 200 bar, and a hydrogen feed rate of 300 to about 1000 normal liters per liter of oil feed.

To further illustrate the present invention and the advantages thereof, the following specific examples are given. The examples are given as specific illustrations of the claimed invention. It should be understood, however, that the invention is not intended to be limited to the specific details set forth in the Examples.

All parts and percentages in the examples as well as the remainder of the specification that refers to solid compositions or concentrations are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

Reasonable variations, modifications and adaptations of the invention can be made within the scope of the described disclosure and the appended claims without departing from the scope of the invention.

EXAMPLES

Example 1

Water was added to a vessel which was heated to temperature of 54.2° C. Into the water was added an aqueous stream of aluminum sulfate (7 wt % a $Al_2O_3$) while stirring until the pH reached 2.85. An aqueous stream of sodium aluminate (23.5 wt % $Al_2O_3$) was then added until the pH reached 9.49. The addition of sodium aluminate was stopped and the mixture was aged for about 3 minutes to complete one swing cycle. The addition rate of the aluminum sulfate and the sodium aluminate solutions were continued respectively so as to cycle two more times the pH of the solution between 3.4 and 9.3, and 3.5 and 9.3, respectively, while maintaining a temperature of about 55° C. as depicted in FIGURE.

At the end of the third cycle, aqueous aluminum sulfate was added to decrease the pH to 3.6. Then aqueous sodium aluminate was added to increase the pH to about 9.2. The precipitated alumina mix was then filtered to provide a filter cake. The filter cake was water washed on a belt filter to remove the residual sodium sulfate, and thereafter was dried at a temperature of about 120° C. The dried alumina powder was used for catalyst support preparation.

The dried alumina powder was peptized by mixing with an aqueous solution of nitric acid in a batch mixer. The wet mix was extruded through buttons with nominal hole diameter of 1.3 mm. The extruded support particles were dried at 120° C., and then calcined at 980° C.

Metals solution was prepared by diluting phosphoric acid with water under agitation. This diluted solution was heated to 90° C. before molybdenum trioxide was slowly added. After all the molybdenum was added the resulting solution was allowed to cook at 90° C. for 1 hour. The solution was diluted with extra water and allowed to cool below 65° C. Then 13% nickel nitrate solution was added resulting in the final metals solution.

The calcined support was impregnated with the metal solution at incipient wetness. The impregnated base was calcined at 510° C. to produce the finished catalyst hereinafter identified as "Catalyst A". Catalyst A had a nominal active metal content of 5 wt % Mo and 0.25 wt % Ni. The catalyst had a total pore volume measured by Hg intrusion of 0.89 cc/g, mesopore volume measured by $N_2$ desorption of 0.68 cc/g and surface area measured by $N_2$ adsorption of 139 m$^2$/g.

Comparative Example 1

Alumina was prepared by coprecipitation by mixing an aqueous stream of aluminum sulfate with an aqueous stream of sodium aluminate. After an initial pH stabilization period, the addition rates of the two streams were adjusted to maintain the pH of the slurry between 7 and 8. At the end of the precipitation process the pH was increased above 9. The precipitated alumina mix was then filtered and water washed on a belt filter to remove the residual sodium sulfate. Filter cake was dried. Dried alumina powder was used for catalyst base preparation.

The dried alumina powder was peptized by mixing with an aqueous solution of nitric acid in a batch mixer. The wet mix was extruded through buttons with nominal hole diameter of 1.3 mm to provided spherical particles. The extruded base particles were dried at 120° C., and then calcined at 1040° C. to provide an alumina support.

Metals solution was prepared by diluting phosphoric acid with water under agitation. This diluted solution was heated to 90° C. before molybdenum trioxide was slowly added. After all the molybdenum was added the resulting solution was allowed to cook at 90° C. for 1 hour. The solution was diluted with extra water and allowed to cool below 65° C. Then 13% nickel nitrate solution was added resulting in the final metals solution.

The extruded supports were impregnated with the metal solution at incipient wetness. The impregnated support was calcined at 510° C. to produce the finished catalyst hereinafter identified as "Catalyst B". Catalyst B had a nominal active metal content of 5 wt % Mo and 0.25 wt % Ni. The catalyst had a total pore volume measured by Hg intrusion of 0.76 cc/g, mesopore volume measured by $N_2$ desorption of 0.52 cc/g and surface area measured by $N_2$ adsorption of 107 m$^2$/g.

Example 2

The performance of Catalyst A and Catalyst B prepared in Example 1 and Comparative Example 1, respectively, were evaluated as follows: The catalyst pellets were loaded in a plug-flow reactor. The feed consisted of an atmospheric resid and hydrogen. The resid had a metal content of 362 ppm V and 71 ppm Ni and a Sulfur content of 4.6 wt %. The reactor temperature was maintained at 713° F., and the average hourly space velocity was 0.75 L/(L.h). Comparative results for metal and sulfur conversion are given in the table below. The results are given for liquid product samples collected at three different time-on-stream values (209, 401, and 617 hours).

TABLE

| | Vanadium conversion, % | | | Nickel conversion, % | | | Sulfur conversion, % | | | MCR conversion, % | | |
|---|---|---|---|---|---|---|---|---|---|---|---|---|
| | at 209 h | at 401 h | at 617 h | at 209 h | at 401 h | at 617 h | at 209 h | at 401 h | at 617 h | at 209 h | at 401 h | at 617 h |
| Catalyst A | 68.7 | 67.4 | 65.7 | 51.0 | 51.3 | 50.6 | 40.8 | 41.2 | 43.1 | 26.4 | 26.8 | 29.3 |
| Catalyst B | 65.5 | 64.2 | 63.5 | 45.5 | 45.6 | 49.0 | 35.8 | 33.5 | 36.2 | 22.7 | 23.9 | 23.6 |

As can be seen in the table above, Catalyst A, prepared using the low temperature, pH-swing alumina of the invention, exhibited enhanced catalytic activity for demetallation and desulfurization as compared to the performance of Catalyst B. Catalyst A also showed increased MCR conversion as compared to Catalyst B.

What is claimed is:

1. A catalyst composition having improved activity and stability in the hydrodemetallation of heavy hydrocarbons, said catalyst composition comprising
    a) a support which comprises precipitated alumina comprising spherical or substantially spherical shaped particles exhibiting a crystalline structure having a first dimension as measured along a 120 XRD plane and a second dimension as measured along a 020 XRD plane, wherein the ratio of the second dimension to the first dimension is less than 1.0;
    b) at least one catalytically active metal selected from the group consisting of a metal of Group 6 of The Periodic Table, a metal of Group 9 of The Periodic Table, a metal of Group 10 of The Periodic Table, and combinations thereof, and optionally phosphorous, wherein the support has a total pore volume in the range of from about 0.8 cc/g to about 1.2 cc/g., with greater than 8% of the volume of pores having a diameter greater than 350 Å, and 40% or greater of the volume of pores having a diameter in the range of about 200 Å to about 500 Å and at least 5% of the volume of pores having a diameter above 1500 Å.

2. The catalyst of claim 1 wherein said at least one catalytic agent is selected from the group consisting of cobalt, nickel, molybdenum and combinations thereof and optionally phosphorous.

3. The catalyst of claim 1 wherein from about 0.04 to about 0.2 cc/g, of the total pore volume of the support is in pores having a diameter greater than 350 Å.

4. The catalyst of claim 1 wherein from about 0.4 to about 0.8 cc/g of the total pore volume of the support is in pores having a diameter in the range of about 200 Å to about 500 Å.

5. The catalyst of claim 1 wherein from about 0.04 to about 0.2 cc/g of the total pore volume of the support has pores in a diameter above 1500 Å.

6. The catalyst of claim 1 wherein the precipitated alumina comprising the support was prepared by
    (a) forming an aqueous slurry by adding at least one acidic compound to water in an amount sufficient to provide an initial aqueous slurry having a pH of less than 5;
    (b) adding an amount of at least one alkaline compound to the initial slurry in an amount sufficient to provide a second slurry having a pH of greater than 7 to precipitate seed alumina;
    (c) repeating steps (a) to (b) at least 1 additional time to provide an alumina containing slurry having pH greater than 7;
    (d) adding an acidic compound to the alumina containing slurry of step (c) in an amount sufficient to provide an alumina slurry having a pH of less than 5;
    (e) adding an alkaline compound to the alumina slurry of step (d) in an amount sufficient to provide a final alumina slurry having a pH of at least about 9; and
    (f) recovering the precipitated alumina from the final alumina slurry;
    wherein the temperature is maintained at a temperature of about 72° C. or less during steps (a)-(e).

7. The catalyst of claim 1 wherein the precipitated alumina has nitrogen total pore volume of greater than 0.9 c/g and a BET surface area of about 80 to about 180 m²/g.

8. The catalyst of claim 6 wherein the support is prepared by
    (g) drying the precipitated alumina of step (f);
    (h) peptizing the dried alumina;
    (i) extruding the peptized alumina; and
    (j) calcining the extrudate at a temperature ranging from about 700° C. to about 1060° C. to obtain support particles.

9. The catalyst of claim 6 wherein the temperature is maintained from about 48° C. to about 68° C. during steps (a)-(e).

10. The catalyst of claim 6 wherein the acidic compound is selected from the group consisting of aluminum sulfate, aluminum nitrate, ammonia sulfate, aluminum chlorohydrol, and combinations thereof.

11. The catalyst of claim 10 wherein the acid compound is aluminum sulfate.

12. The catalyst of claim 6 wherein the alkaline compound is selected from the group consisting of sodium aluminate, aluminum hydroxide, sodium hydroxide, ammonium hydroxide and combinations thereof.

13. The catalyst of claim 12 wherein the alkaline compound is sodium aluminate.

14. The catalyst of claim 6 wherein the pH of the initial slurry of step (a) ranges from about 2.0 to about 4.5.

15. The catalyst of claim 6 wherein the pH of the second slurry of step (b) and the alumina containing slurry of step (c) ranges from about 7.5 to about 10.

16. The catalyst of claim 6 wherein the pH of the alumina slurry of step (d) ranges from about 2.0 to about 4.5.

17. The catalyst of claim 6 wherein the pH of the final alumina slurry of step (e) ranges from about 9 to about 9.5.

18. A process for the hydrotreating of a metal containing heavy hydrocarbon fraction to remove metals, which process comprises contacting a heavy hydrocarbon fraction containing metals and optionally sulfur with a catalyst of claim 1 under hydrotreating process conditions and reducing the content of metals in the heavy hydrocarbon fraction.

* * * * *